(12) United States Patent
Sommer et al.

(10) Patent No.: US 11,967,481 B2
(45) Date of Patent: Apr. 23, 2024

(54) LIQUID CRYSTAL POLYMER FOR MOUNTING X-RAY WINDOW

(71) Applicant: Moxtek, Inc., Orem, UT (US)

(72) Inventors: Jared Sommer, Bountiful, UT (US); Jonathan Abbott, Saratoga Springs, UT (US)

(73) Assignee: Moxtek, Inc., Orem, UT (US)

( * ) Notice: Subject to any disclaimer, the term of this patent is extended or adjusted under 35 U.S.C. 154(b) by 207 days.

(21) Appl. No.: 17/671,861

(22) Filed: Feb. 15, 2022

(65) Prior Publication Data

US 2022/0172918 A1 Jun. 2, 2022

Related U.S. Application Data

(63) Continuation of application No. 17/210,299, filed on Mar. 23, 2021, now Pat. No. 11,295,924, which is a continuation of application No. 16/433,202, filed on Jun. 6, 2019, now Pat. No. 10,991,540.

(60) Provisional application No. 62/694,503, filed on Jul. 6, 2018.

(51) Int. Cl.
*H01J 35/18* (2006.01)
*C09J 161/00* (2006.01)
*C09J 167/00* (2006.01)
*G01T 1/16* (2006.01)
*H01J 5/18* (2006.01)

(52) U.S. Cl.
CPC ............ *H01J 35/18* (2013.01); *C09J 161/00* (2013.01); *C09J 167/00* (2013.01); *G01T 1/16* (2013.01); *H01J 5/18* (2013.01); *H01J 2235/183* (2013.01)

(58) Field of Classification Search
CPC ...... H01J 5/18; H01J 5/24; H01J 33/04; H01J 35/18; H01J 9/26; C09J 161/00; C09J 167/00

See application file for complete search history.

(56) References Cited

U.S. PATENT DOCUMENTS

| | | | |
|---|---|---|---|
| 4,933,557 A | 6/1990 | Perkins et al. | |
| 4,960,486 A | 10/1990 | Perkins et al. | |
| 5,637,880 A | 6/1997 | Horino et al. | |
| 7,985,467 B1 | 7/2011 | Shu et al. | |
| 9,502,206 B2 | 11/2016 | Harker et al. | |
| 2003/0094582 A1 | 5/2003 | Weiss et al. | |
| 2004/0060635 A1* | 4/2004 | Diepers | C09J 5/06 156/60 |
| 2004/0120466 A1* | 6/2004 | Turner | H01J 5/18 378/161 |
| 2005/0223945 A1 | 10/2005 | Baumgart et al. | |
| 2007/0111617 A1* | 5/2007 | Meilahti | H01J 47/004 442/1 |
| 2008/0296479 A1 | 12/2008 | Anderson et al. | |

(Continued)

*Primary Examiner* — Dani Fox
*Assistant Examiner* — Soorena Kefayati
(74) *Attorney, Agent, or Firm* — Thorpe North & Western, LLP

(57) ABSTRACT

An x-ray window can include an adhesive layer sandwiched between and providing a hermetic seal between a thin film and a housing. The adhesive layer can include liquid crystal polymer. The liquid crystal polymer can be opaque, gastight, made of low atomic number elements, able to withstand high temperature, low outgassing, low leakage, able to relieve stress in the x-ray window thin film, capable of bonding to many different materials, or combinations thereof.

20 Claims, 4 Drawing Sheets

(56) References Cited

U.S. PATENT DOCUMENTS

Figure 1:
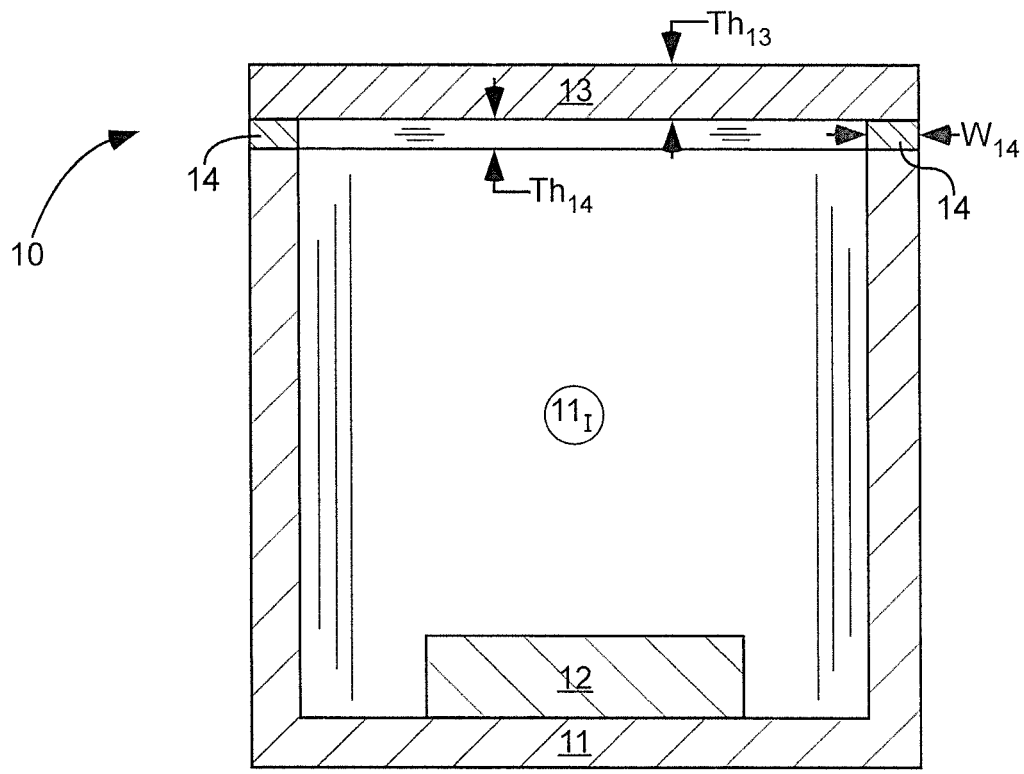

| | | |
|---|---|---|
| 2008/0296518 A1 | 12/2008 | Xu et al. |
| 2008/0317209 A1 | 12/2008 | Sipila et al. |
| 2009/0086923 A1* | 4/2009 | Davis .................. H01J 5/18 156/279 |
| 2009/0173897 A1 | 7/2009 | Decker et al. |
| 2009/0212681 A1 | 8/2009 | Matsumura et al. |
| 2011/0121179 A1* | 5/2011 | Liddiard ............... H01J 47/004 250/336.1 |
| 2011/0311029 A1* | 12/2011 | Andersson ............ H01J 35/18 156/247 |
| 2012/0025110 A1* | 2/2012 | Davis .................. H01J 5/18 428/114 |
| 2012/0087476 A1* | 4/2012 | Liddiard .................. G21K 1/00 378/140 |
| 2012/0213336 A1 | 8/2012 | Liddiard |
| 2012/0328888 A1 | 12/2012 | Kinzeimann et al. |
| 2013/0051535 A1* | 2/2013 | Davis .................. H01J 5/18 264/400 |
| 2013/0077761 A1* | 3/2013 | Sipila .................. H01L 31/028 438/57 |
| 2013/0094629 A1 | 4/2013 | Liddiard et al. |
| 2013/0235979 A1* | 9/2013 | Hemberg ............ H01J 35/025 378/143 |
| 2013/0315380 A1 | 11/2013 | Davis et al. |
| 2014/0008538 A1* | 1/2014 | Soltau .................. G01T 1/2928 378/161 |
| 2014/0044240 A1 | 2/2014 | Pahlke et al. |
| 2014/0127446 A1 | 5/2014 | Davis et al. |
| 2014/0140487 A1* | 5/2014 | Harker .................. G21K 1/00 378/161 |
| 2015/0016590 A1 | 1/2015 | Parker et al. |
| 2015/0016593 A1 | 1/2015 | Larson et al. |
| 2015/0053640 A1* | 2/2015 | Kostamo ................ B32B 38/10 156/108 |
| 2015/0146866 A1* | 5/2015 | Tuohimaa ............... H01J 35/18 378/140 |
| 2015/0162163 A1 | 6/2015 | Anno et al. |
| 2015/0303024 A1 | 10/2015 | Harker et al. |
| 2015/0357150 A1* | 12/2015 | Kostamo ................ H01J 5/18 216/2 |
| 2015/0371806 A1 | 12/2015 | Watson et al. |
| 2016/0306084 A1 | 10/2016 | Padiyath et al. |
| 2016/0336145 A1 | 11/2016 | Ominami et al. |
| 2017/0032923 A1 | 2/2017 | Tsunoda et al. |
| 2017/0154749 A1* | 6/2017 | Torma ................. H01L 31/1896 |
| 2018/0019089 A1* | 1/2018 | Lairson .................. H01J 5/18 |
| 2018/0323033 A1 | 11/2018 | Black et al. |
| 2019/0252150 A1 | 8/2019 | Yamada et al. |
| 2019/0355539 A1 | 11/2019 | Chekurov et al. |
| 2020/0181975 A1 | 6/2020 | Padiyath et al. |
| 2021/0233752 A1* | 7/2021 | Kostamo .................. H01J 5/18 |

* cited by examiner

LIQUID CRYSTAL POLYMER FOR MOUNTING X-RAY WINDOW

CLAIM OF PRIORITY

This application is a continuation of U.S. patent application Ser. No. 17/210,299, filed on Mar. 23, 2021, which is a continuation of U.S. patent application Ser. No. 16/433,202, filed on Jun. 6, 2019, which claims priority to U.S. Provisional Patent Application No. 62/694,503, filed on Jul. 6, 2018, which are incorporated herein by reference.

FIELD OF THE INVENTION

The present application is related generally to x-ray windows.

BACKGROUND

A hermetic seal in an x-ray window can have demanding requirements. For example, light penetration through the hermetic seal into an interior of an x-ray detection device can result in interference with a signal from a sample. Thus, it can be helpful for the hermetic seal to be opaque. X-ray fluorescence from the hermetic seal can interfere with the signal from the sample, particularly x-ray fluorescence from high atomic number elements in the hermetic seal. Therefore, it can be helpful for the hermetic seal to be made of low atomic number elements.

Many x-ray devices have an internal vacuum and a getter for maintaining this vacuum. Such getters are typically activated more quickly at higher temperatures. Therefore, it can be helpful for the hermetic seal to be able to withstand high temperature. Outgassing of components of such x-ray devices can result in an undesirable rise of internal pressure. Thus, low outgassing of the hermetic seal can also be a useful characteristic. Even small leakage through components of the x-ray device can gradually cause an undesirable rise of internal pressure and malfunctioning of the device. Therefore, it can also be useful for the hermetic seal to have a low leak rate.

An x-ray window thin film can develop internal stress during manufacture or use due to coefficient of thermal expansion mismatch between the x-ray window thin film and a housing to which it is bonded. It can be helpful for the hermetic seal to relieve such stress.

Many different materials are used for the x-ray window thin film and the x-ray device housing. It can be useful for the hermetic seal to be capable of bonding to a large variety of materials.

SUMMARY

It has been recognized that it would be advantageous to provide a hermetic seal for an x-ray window which is opaque, which is made of low atomic number elements, which can withstand high temperature, with low outgassing, with low leakage, which is able to relieve stress in the x-ray window thin film, and which can bond to many different materials. The present invention is directed to various embodiments of x-ray windows, and methods of making x-ray windows, that satisfy these needs. Each embodiment may satisfy one, some, or all of these needs.

The x-ray window can comprise a thin film configured for transmission of x-rays, a housing, and an adhesive layer sandwiched between and providing a hermetic seal between the thin film and the housing. The adhesive layer can include liquid crystal polymer.

BRIEF DESCRIPTION OF THE DRAWINGS (DRAWINGS MIGHT NOT BE DRAWN TO SCALE)

FIG. 1 is a schematic, cross-sectional side-view of an x-ray window 10 including an adhesive layer 14 sandwiched between and providing a hermetic seal between a thin film 13 and a housing 11, in accordance with an embodiment of the present invention.

Figure 2:
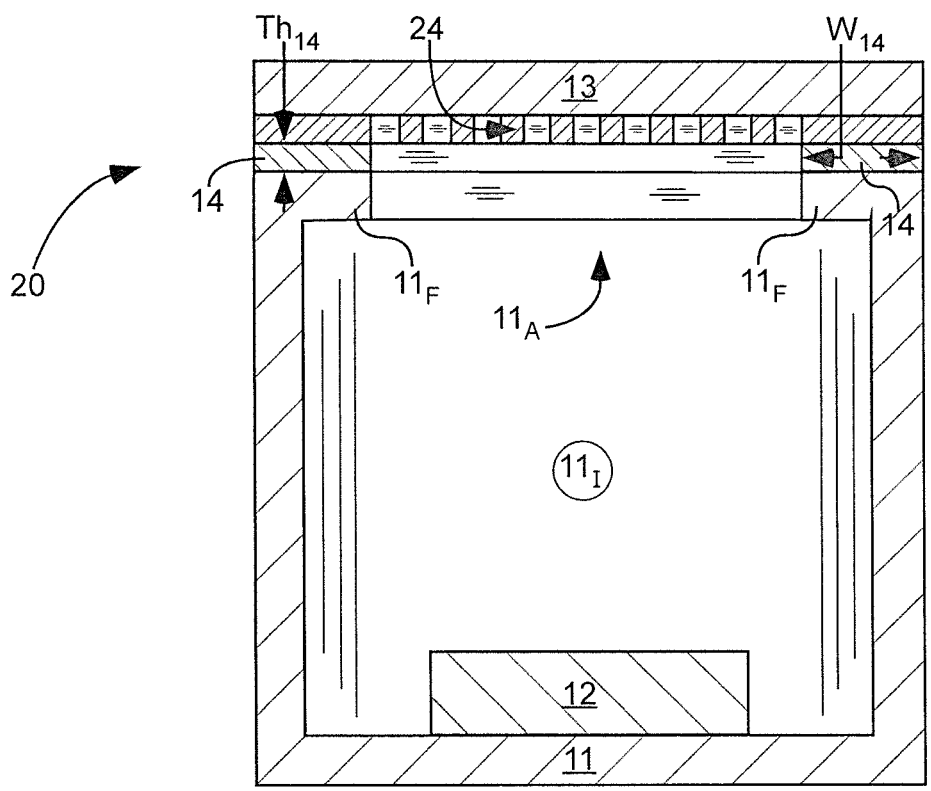

FIG. 2 is a schematic, cross-sectional side-view of an x-ray window 20 including an adhesive layer 14 sandwiched between and providing a hermetic seal between a thin film 13 and a flange $11_F$ of a housing 11, and a ribbed support structure 24 sandwiched between the thin film 13 and the adhesive layer 14, in accordance with an embodiment of the present invention.

Figure 3:
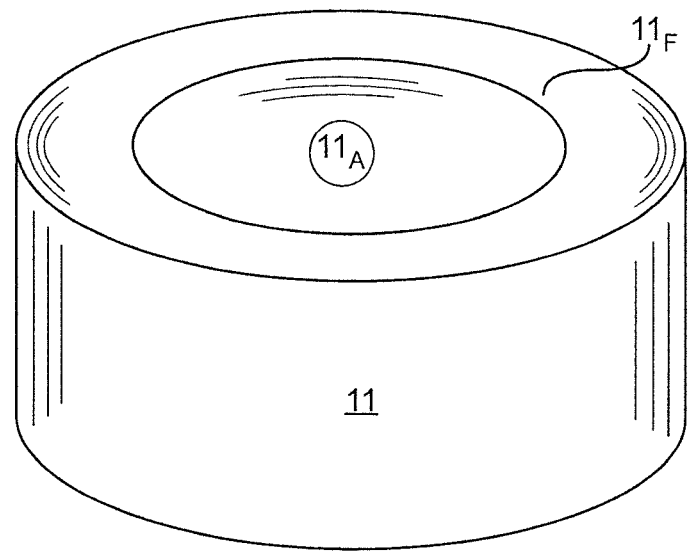
Figure 4:
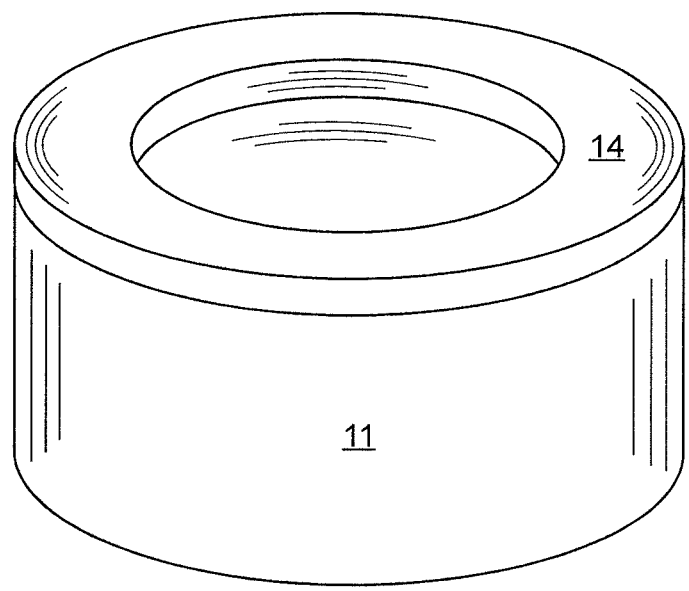
Figure 5:
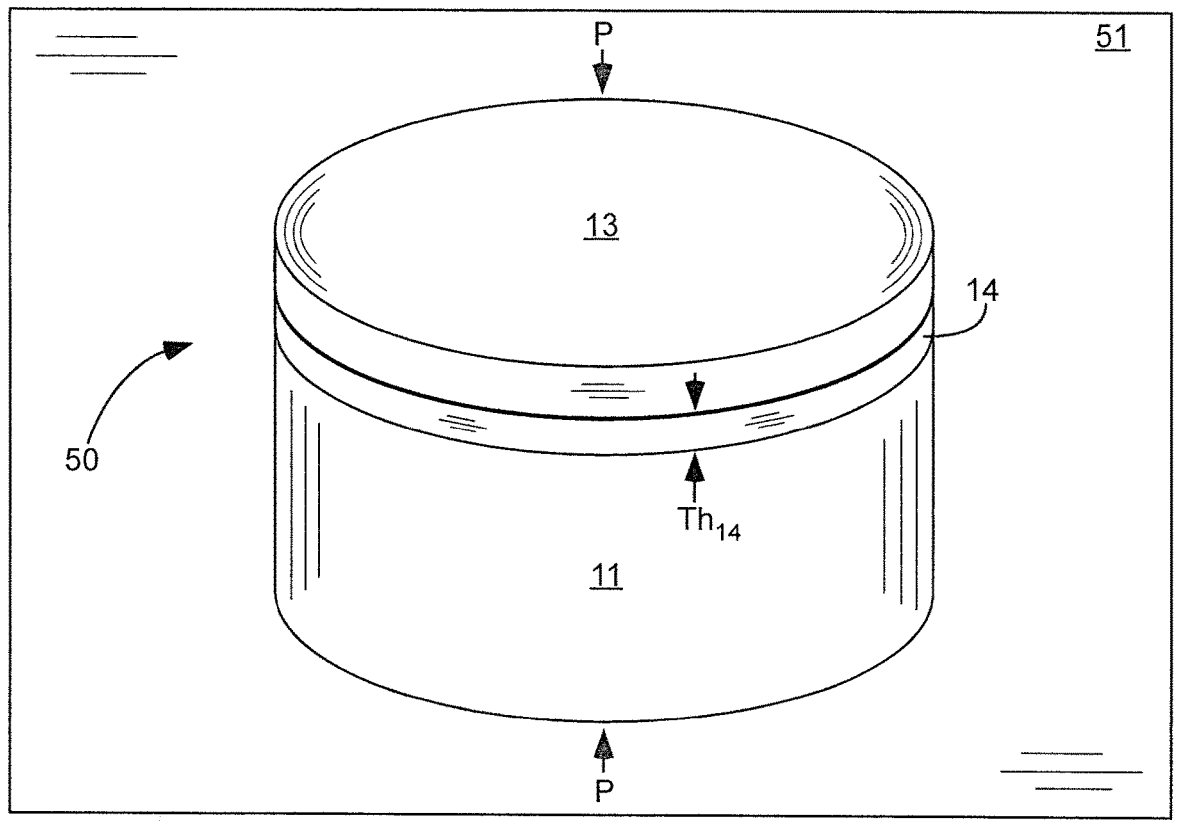

FIGS. 3-5 are schematic perspective-views illustrating a method of making an x-ray window 50, in accordance with an embodiment of the present invention.

Figure 6:
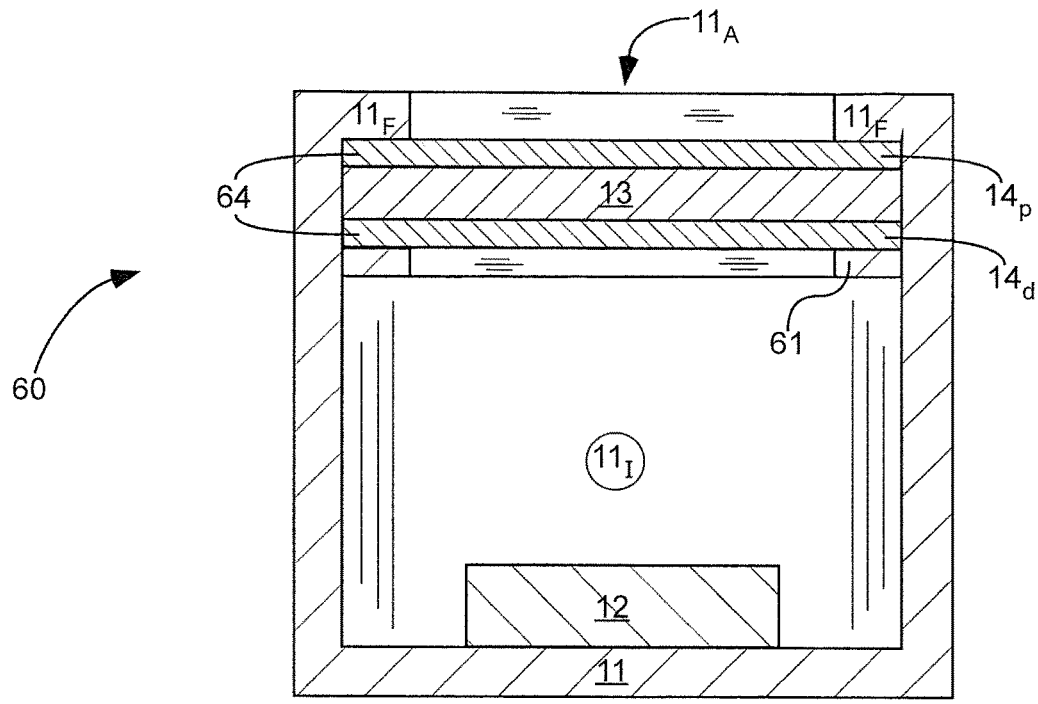
Figure 7:
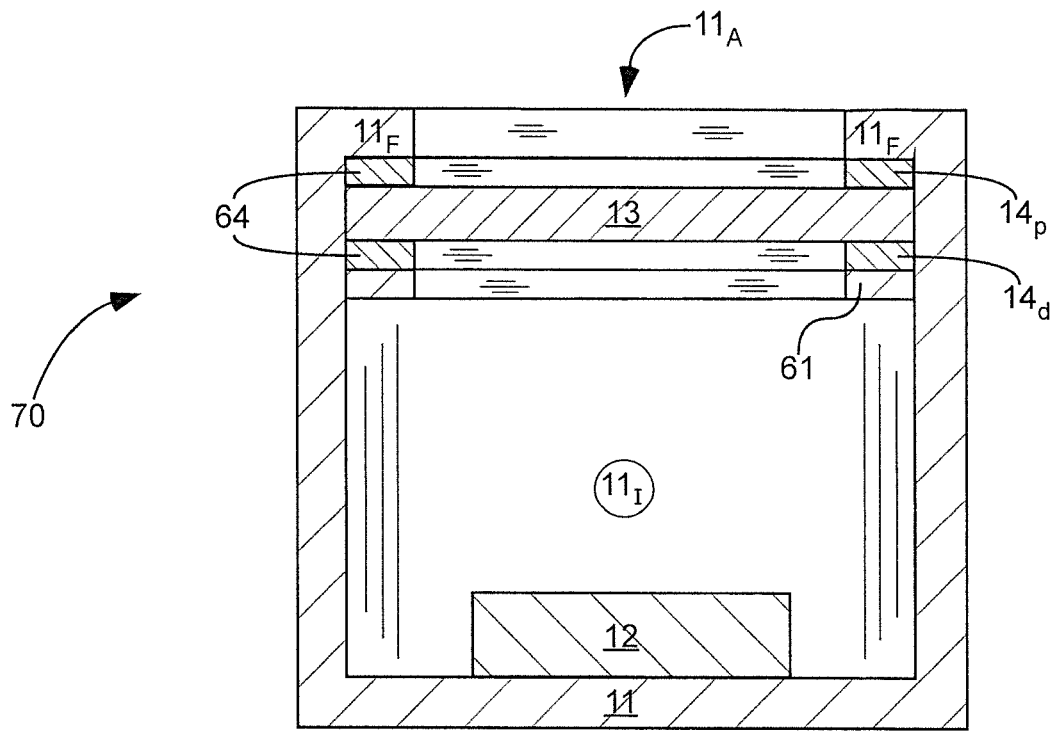
Figure 8:
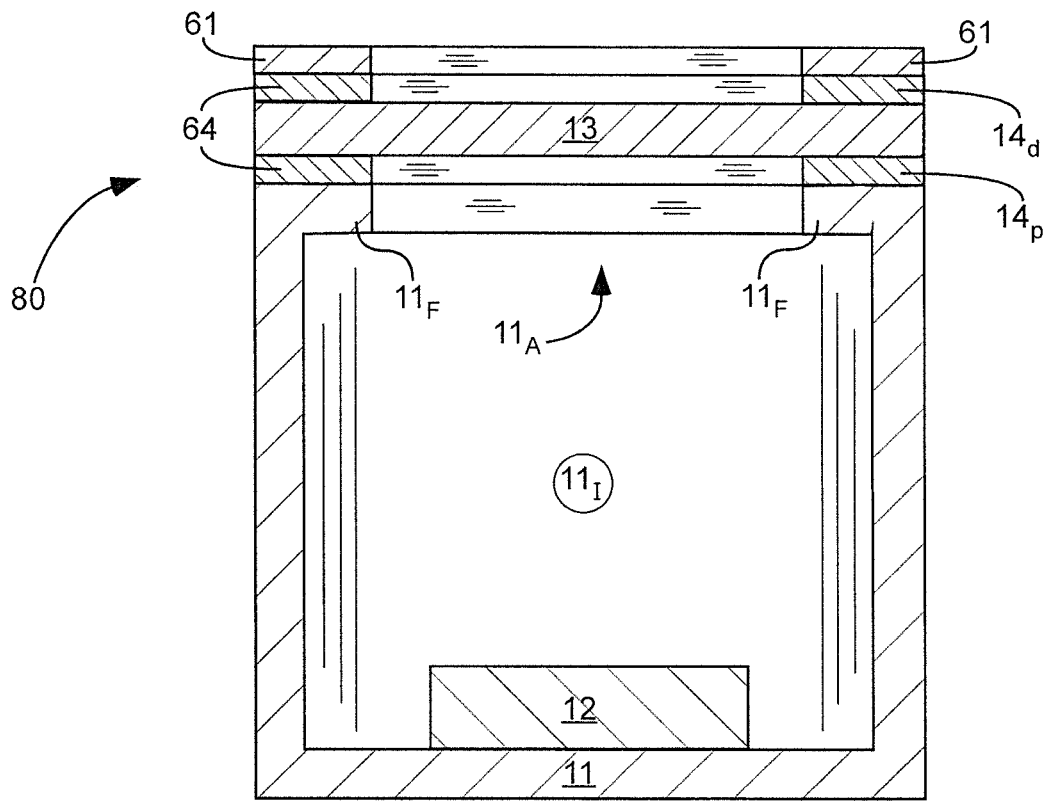

FIGS. 6-8 are schematic, cross-sectional side-views of x-ray windows 60, 70, and 80 including the thin film 13 sandwiched between a pair of adhesive layers 64, and hermetically sealed to the housing 11 by one or both of the adhesive layers 64, in accordance with embodiments of the present invention.

DEFINITIONS

As used herein, the term "adjoin" means direct and immediate contact.

As used herein, the term "annular" means ring-shaped, but is not limited to a circular shape. The annular shape can have other curved shapes, such as for example elliptical.

As used herein, "cps" means centipoise.

As used herein, "KPa" means kilopascals, "MPa" means megapascals, and "GPa" means gigapascals.

As used herein, in the unit "mbar*L/sec", "mbar" means millibars, each millibar equal to 100 pascals, "L" means liters, and "sec" means second.

As used herein, "nm" means nanometer(s) and "μm" means micrometer(s).

DETAILED DESCRIPTION

As illustrated in FIGS. 1, 2, and 5, x-ray windows 10, 20, and 50, respectively, are shown comprising an adhesive layer 14 sandwiched between and providing a hermetic seal between a thin film 13 and a housing 11. The thin film 13 can extend across an aperture $11_A$ of the housing 11. The thin film 13 and the housing 11 can adjoin the adhesive layer 14.

The adhesive layer 14 can be or can include epoxy, liquid crystal polymer, or other type of adhesive. For example, ≥50%, ≥75%, ≥90%, ≥95%, ≥99%, or 100% of the adhesive layer 14 can be liquid crystal polymer. The adhesive layer 14 can have certain characteristics for improved performance as will be described in the following few paragraphs.

As illustrated in FIG. 2, x-ray window 20 can further comprise a ribbed support structure 24, providing structural support to the thin film 13, and sandwiched between the thin film 13 and the adhesive layer 14. The ribbed support structure 24 can extend across the aperture $11_A$ of the housing 11, and can provide support for the thin film 13 across the aperture $11_A$ of the housing 11. The thin film 13, the adhesive layer 14, or both can adjoin the ribbed support structure 24. Alternatively, there can be other or additional materials between the thin film 13 and the adhesive layer 14. There can also be other materials between the housing 11 and the adhesive layer 14. The ribbed support structure 24 can comprise silicon.

If the adhesive layer 14 is not viscous enough, it can wick into channels of the ribbed support structure 24. The adhesive layer 14 in such channels can damage the ribbed support structure 24. The adhesive layer 14 in such channels can block or fluoresce x-rays, which can interfere with an x-ray signal from a sample. Therefore, it can be helpful for the adhesive layer 14 to have high viscosity. Example viscosity values of the adhesive layer 14 include ≥10,000 cps, ≥50,000 cps, ≥80,000 cps, ≥100,000 cps, ≥200,000 cps, or ≥250,000 cps and ≤400,000 cps, ≤600,000 cps, or ≤1,000,000 cps, each at 300° C. All viscosity values herein are static viscosity.

For improved bonding of the thin film 13 to the housing 11, the adhesive layer 14 can have shear thinning properties, with non-Newtonian behavior and a reduction of viscosity when under shear stress.

As illustrated in FIGS. 1 and 2, the x-ray windows 10 or 20 can be part of an x-ray device, such as for example an x-ray detection device or an x-ray tube. An x-ray component 12, which can be an x-ray detector or an electron emitter, can be located at least partially within an interior $11_I$ of the housing 11 and can face the x-ray window 10 or 20.

These x-ray devices typically have a vacuum in the interior $11_I$ of the housing 11. A getter is commonly used to achieve and maintain this vacuum. Because the getter is more quickly activated at higher temperatures, manufacturing time can be reduced if the thin film 13 is sealed to the housing 11 at a high temperature. Therefore, it can be useful for the adhesive layer 14 to be able to withstand high temperature without degradation. It can be useful for the adhesive layer 14 to have a high melting temperature, or if the adhesive layer 14 is a liquid crystal polymer, to have a high transition temperature $T_{LC}$ (temperature of transition between solid and liquid crystal states). Example transition temperature $T_{LC}$ values of the liquid crystal polymer include ≥200° C., ≥260° C., ≥270° C., ≥300° C., ≥350° C., or ≥400° C. and ≤500° C., ≤600° C., or ≤800° C.

Visible or infrared light can interfere with operation of the x-ray component 12, such as an x-ray detector. Therefore, it can be helpful for the adhesive layer 14 to be opaque. For example, transmissivity of light, with a wavelength of 550 nm, with a wavelength of 800 nm, or both, through the adhesive layer 14 into the interior $11_I$ of the housing 11, can be of ≤10%, ≤3%, or ≤2%.

The adhesive layer 14 can have a low Young's Modulus, low tensile strength and high elongation to compensate for a mismatch of the coefficient of thermal expansion between the thin film 13 and the housing 11. Such properties can allow flexure of the adhesive layer 14 when the thin film 13 and the housing 11 expand or contract at different rates during temperature changes, thus avoiding window fracture or distortion.

Example Young's Modulus values of the adhesive layer 14 include ≥100 MPa, ≥500 MPa, or ≥1 GPa and ≤2 GPa, ≤5 GPa, ≤8 GPa, or ≤12 GPa, each at 25° C. Example tensile strength values of the adhesive layer 14 include ≥100 MPa, ≥125 MPa, ≥150 MPa, or ≥175 MPa and ≤200 MPa, ≤225 MPa, ≤250 MPa, or ≤300 MPa, each at 25° C. Each of these tensile strength values can be for machine direction (roll-out direction of the liquid crystal polymer), transverse direction (transverse to the machine direction/roll-out direction), or both.

Elongation is strain before failure in tensile testing. Elongation is equal to (final length−initial length)/initial length. Example elongation values of the adhesive layer 14 include ≥10%, ≥20%, or ≥30% and ≤40%, ≤50%, or ≤60%, each at 25° C.

The adhesive layer 14 can have isotropic properties, depending on its method of manufacture. Anisotropy of the adhesive layer 14 close or equal to zero might be preferable for uniform bond characteristics. For example, anisotropy of the adhesive layer 14 can be ≤300 MPa, ≤250 MPa, ≤200 MPa, ≤150 MPa, ≤100 MPa, ≤75 MPa, ≤50 MPa, or ≤25 MPa, each at 25° C. Anisotropy is calculated by subtracting tensile strength in the transverse direction from tensile strength in the machine direction.

The thin film 13 and the housing 11 can have low coefficient of thermal expansion values. It can be helpful for the adhesive layer 14 to have a coefficient of thermal expansion close to that of the thin film 13, the housing 11, or both. Example coefficient of thermal expansion values of the adhesive layer 14 include ≥0 m/(m*K), ≥$10^{-6}$ m/(m*K), or ≥$2 \times 10^{-6}$ m/(m*K) and ≤$5 \times 10^{-6}$ m/(m*K), ≤$10 \times 10^{-6}$ m/(m*K), ≤$20 \times 10^{-6}$ m/(m*K), ≤$30 \times 10^{-6}$ m/(m*K), ≤$35 \times 10^{-6}$ m/(m*K), ≤$40 \times 10^{-6}$ m/(m*K), or ≤$45 \times 10^{-6}$ m/(m*K), each at 25° C.

It can be helpful for the adhesive layer 14 to have low outgassing under vacuum after bonding. This property can avoid reduction of an internal vacuum of the final device. Weight loss of the heated adhesive layer 14 can be used to quantify outgassing. For example, weight loss of the adhesive layer 14, prior to placing the adhesive layer 14 between the thin film 13 and the housing 11, can be ≤5%, ≤3%, ≤2%, ≤1%, ≤0.7%, or ≤0.6%, at a temperature of 225° C. during a 24 hour period.

Use of a liquid crystal polymer as the adhesive layer 14 can provide a strong hermetic seal between many different x-ray window thin film 13 materials and many different housing materials, thus reducing gas leakage through the hermetic seal. For example, liquid crystal polymers can bond effectively to silicon, boron, aluminum, stainless steel, nickel, copper, or combinations thereof. The thin film 13, the housing 11, or both can include one or more of these materials. Examples of the leak tightness of the x-ray windows 10, 20, and 50 described herein include average helium leak rate of ≤$10^{-9}$ mbar*L/sec, ≤$10^{-10}$ mbar*L/sec, or ≤$3 \times 10^{-10}$ mbar*L/sec, at a temperature of 25° C., for at least the first 10 hours after forming the hermetic seal.

X-ray windows are commonly used with x-ray detection devices. X-ray fluorescence from material other than the sample measured/detected can interfere with the x-ray signal from the sample. This problem is usually worse if such interfering x-ray fluorescence is from a material with high atomic number. Therefore, it can be helpful if the adhesive layer 14 is made of material(s) with low atomic numbers. For example, ≥70%, ≥80%, ≥90%, or ≥95% of the atoms in the adhesive layer 14 can have an atomic number≤6. As another example, ≥90%, ≥95%, ≥99%, or 100% of the atoms in the adhesive layer 14 can have an atomic number≤8. Therefore, the adhesive layer 14 can be made primarily of carbon (Z=6), hydrogen (Z=1), and oxygen (Z=8).

Various types of liquid crystal polymer can be used as the adhesive layer 14 in the embodiments described herein. For example, the liquid crystal polymer can be main chain, side chain, linear, cyclic, branched, crosslinked, or combinations thereof. The liquid crystal polymer can be thermotropic or lyotropic. The liquid crystal polymer can be an aromatic polyester. The polymer of the liquid crystal polymer can be formed from the following monomers: 4-hydroxybenzaldehyde, 6-hydroxy-2-naphthaldehyde, 4,4'-biphenol, terephthalaldehyde, ethane-1,2-diol, or combinations thereof. The mesogen used in formation of the liquid crystal polymer can be disc-like, rod-like, amphiphilic, or combinations thereof. The liquid crystal polymers 14 can form regions of highly ordered structure while in the liquid phase.

Proper selection of a width of a mounting surface can improve bonding, reduce leakage, and reduce cost. As illustrated in FIG. 2 on x-ray window 20, the housing 11 can have a flange $11_F$ encircling an aperture $11_A$. The adhesive layer 14 can be located on the flange $11_F$ and can have an annular shape encircling the aperture $11_A$ of the housing 11. Although x-ray window 20 in FIG. 2 shows mounting on an exterior of the flange $11_F$, this invention is equally applicable to a mount on an inside of the flange $11_F$, at an interior $11_I$ of the housing 11. Example widths $W_{14}$ of the adhesive layer 14 on the flange $11_F$ include ≥0.5 mm, ≥1 mm, or ≥3 mm and ≤7 mm, ≤10 mm, ≤15 mm, or ≤50 mm. In addition, the adhesive layer 14 between the thin film 13 and the housing 11 can have a thickness $Th_{14}$ of ≥10 μm and ≤500 μm.

It can be useful for the thin film 13 to be strong (especially strong enough to withstand a differential pressure of 1 atm) and allow a high percent transmission of x-rays. The thin film 13 can have sufficient thickness for strength, but not have a thickness that will cause excessive attenuation of x-rays. For example, the thin film 13 can have a thickness $Th_{13}$ of ≤0.01 micrometers, ≥0.2 micrometers, ≥10 micrometers, or ≥100 micrometers; and ≤500 micrometers, ≤1 millimeter, or ≤5 millimeters. The thickness can depend on material of construction, span-width, differential-pressure, and application. Material of construction for the thin film 13 can include or consist of materials with an atomic number ≤14, ≤6, ≤4; and can include beryllium, hydrogen, oxygen, carbon, silicon, and nitrogen.

A differential pressure across the thin film 13 (e.g. a vacuum on one side and air or vacuum on an opposite side) can cause it to bow or deflect excessively, damaging the x-ray window, and also possibly causing a short circuit by creating an unintended electrical-current path, or, for an x-ray tube, a change in electron-beam focusing. Thus, it can be useful to minimize the deflection distance. The thin film 13 described herein can be made sufficiently strong and thus can have a relatively small deflection distance. For example, the thin film 13 can have a deflection distance of ≤400 micrometers, ≤300 micrometers, ≤200 micrometers, or ≤100 micrometers, with one atmosphere differential pressure across the thin film 13.

It can be useful for x-ray windows to have a high transmissivity of x-rays, including a high transmission of low-energy x-rays. The thin film 13 described herein can have a high transmissivity of x-rays. For example, the thin film 13 can have a transmissivity of ≥50%, ≥60%, ≥70%, ≥74%, or ≥80% for x-rays having an energy of 1.74 keV.

For some applications, it can be useful for x-ray windows to block visible and infrared light transmission in order to avoid creating undesirable noise in sensitive instruments. For example, the thin film 13 described herein can have a transmissivity of ≤10%, ≤3%, or ≤2% for visible light at a wavelength of 550 nanometers and/or a transmissivity of ≤10%, ≤4%, or ≤3% for infrared light at a wavelength of 800 nanometers.

The thin film 13 can include some or all of the properties (e.g. low deflection, high x-ray transmissivity, low visible and infrared light transmissivity) of the x-ray windows described in U.S. Pat. No. 9,502,206, which is incorporated herein by reference in its entirety.

Method

A method of making an x-ray window 50 can comprise some or all of the following steps, which are illustrated in FIGS. 3-5. These steps can be performed in the following order or other order if so specified. There may be additional steps not described below. These additional steps may be before, between, or after those described. The x-ray window 50 and its components can have properties as described above for the x-ray windows 10 or 20.

The method can include placing an adhesive layer 14 between a thin film 13 and a housing 11. Another step in the method can be applying a pressure P to press the thin film 13 and the housing 11 towards each other and towards the adhesive layer 14 sandwiched between them. An additional step in the method can be heating the x-ray window, such as for example in oven 51. Applying the pressure P and heating can be done simultaneously or sequentially. For example, a small weight can be placed on the thin film 13 and the housing 11.

Pressure, duration under such pressure, and temperature can be adjusted for optimal bonding and throughput. Increased pressure can reduce processing time and increase bond strength, but can result in damage to sensitive components or undesirable thinning of the adhesive layer 14. Examples of pressure ranges, particularly applicable if the adhesive layer 14 is liquid crystal polymer, include ≥0.01 KPa, ≥0.1 KPa, ≥0.15 KPa, ≥0.2 KPa, ≥0.5 KPa, ≥1 KPa, or ≥5 KPa and ≤10 KPa, ≤20 KPa, ≤30 KPa, ≤50 KPa, or ≤100 KPa.

Increased temperature can reduce processing time and better fill gaps and holes in the bonded materials, but can result in thermal damage to the adhesive layer 14 or other x-ray window components. The optimal temperature can be selected based on applied pressure P, processing time, temperature sensitivity of components, and desired bonding strength. For example, the x-ray window 50, with liquid crystal polymer as the adhesive layer 14, can be heated to a temperature above the transition temperature $T_{LC}$ of the liquid crystal polymer. For example, the x-ray window 50 can be heated ≥10° C., ≥50° C., or ≥70° C. above the transition temperature $T_{LC}$ of the liquid crystal polymer. Further, the x-ray window 50 can be heated ≤90° C., ≤100° C., or ≤150° C. above the transition temperature $T_{LC}$ of the liquid crystal polymer. As another example, the x-ray window 50 can be heated to a temperature of ≥100° C., ≥150° C., ≥200° C., ≥250° C., or ≥300° C. and ≤350° C., ≤400° C., ≤500° C., or ≤600° C.

A slow cure at a relatively lower temperature and pressure can result in an improved bond, but can increase cost due to reduced throughput. Examples of processing time (time during which the x-ray window 50 is maintained under pressure P and heat) include 5 minutes, ≥15 minutes, ≥20 minutes, ≥30 minutes, or ≥1 hour and ≤2 hours, ≤3 hours, ≤4.5 hours, ≤6 hours, or ≤10 hours.

The liquid crystal polymer can be initially dissolved in a solvent. The solution (liquid crystal polymer and solvent) can be applied to the thin film 13, the housing 11, or both, then baked to remove the solvent and bond the thin film 13 to the housing 11. Alternatively, the liquid crystal polymer can be in pellet form, which can be pressed and placed onto the thin film 13, the housing 11, or both, then baked. The liquid crystal polymer can be formed into a sheet/film. This sheet/film can then be cut to shape and placed on the thin film 13 or the housing 11. The thin film 13 and the housing 11 can be pressed together with the liquid crystal polymer between, then baked. A choice between these methods can be based on manufacture cost of the liquid crystal polymer, final bond strength, manufacture cost of the x-ray window, and isotropic properties of the liquid crystal polymer.

X-Ray Window with Mirror-Image Bond

As illustrated in FIGS. 6, 7, and 8, x-ray windows 60, 70, and 80, respectively, are shown comprising a housing 11 including a flange $11_F$ encircling an aperture $11_A$, a thin film 13, and a pair of adhesive layers 64. The thin film 13 can be sandwiched between the pair of adhesive layers 64, and can be hermetically sealed to the housing 11 by one or both of the adhesive layers 64. The pair of adhesive layers 64 can be pressed and cured together as described above in the Method section. Use of two adhesive layers 64 can balance compressive stress in the thin film 13, and can improve leak tightness of the x-ray window.

As illustrated in FIG. 6, one or both of the adhesive layers 64 can be a sheet extending across the aperture 11A of the housing 11. As illustrated in FIGS. 7 and 8, one or both of the adhesive layers 64 can have an annular shape with an aperture. The aperture of the adhesive layers 64 can encircle the aperture $11_A$ of the housing 11. The aperture of the adhesive layers 64 can be aligned with the aperture $11_A$ of the housing 11. A decision between these different embodiments can be made based on cost, manufacturability, x-ray attenuation by the adhesive layers 64, and leak-tightness.

As illustrated in FIGS. 6 and 7, the thin film 13 and the pair of adhesive layers 64 can be mounted inside of the flange $11_F$ of the housing 11. As illustrated in FIG. 8, the thin film 13 and the pair of adhesive layers 64 can be mounted outside of the flange $11_F$ of the housing 11. See US Patent Publication Numbers US 2014/0008538 and US 2018/0323033 for additional information about the advantages of mounting inside or outside of the flange.

The adhesive layer 14 described above can be one layer of the pair of adhesive layers 64, specifically a proximal adhesive layer $14_p$, closer to the housing 11 than the other layer, the distal adhesive layer $14_d$. The proximal adhesive layer $14_p$, the distal adhesive layer $14_d$, or both, can have properties as described above for the adhesive layer 14. The pair of adhesive layers 64 can have a same material composition with respect to each other. The housing 11 and the thin film 13 can also have properties as described above. The thin film 13 can be sandwiched between the proximal adhesive layer $14_p$ and the distal adhesive layer $14_d$.

The x-ray window can further comprise a ring 61 located at an opposite side of the distal adhesive layer $14_d$ from the thin film 13. Thus, the distal adhesive layer $14_d$ can be sandwiched between the ring 61 and the thin film 13. In one embodiment, the ring 61 can be metallic. The ring can comprise an iron-nickel-cobalt alloy, such as for example Kovar (ASTM F 15 Alloy). In order to avoid thermal expansion mismatch, the ring 61 and the housing 11 can have a same material composition with respect to each other. Thus, both can be metallic, both can comprise an iron-nickel-cobalt alloy, or both can include Kovar. Use of the ring 61 can improve bonding the hermetic seal.

What is claimed is:

1. A method of making an x-ray window, the method comprising:

placing a liquid crystal polymer between a thin film and a housing, the liquid crystal polymer includes an aromatic polyester;

pressing the thin film and the housing towards each other and towards the liquid crystal polymer sandwiched between them; and heating the x-ray window to a temperature of $\geq 250°$ C. and $\leq 500°$ C.; and wherein heating the x-ray window includes maintaining the x-ray window at the temperature for a time of $\geq 30$ minutes and $\leq 6$ hours.

2. The method of claim 1, wherein the thin film and the housing are pressed towards each other and towards the liquid crystal polymer with a pressure of $\geq 1$ KPa and $\leq 50$ KPa.

3. The method of claim 1, wherein the thin film and the housing are pressed towards each other and towards the liquid crystal polymer with a pressure of $\geq 1$ KPa.

4. The method of claim 1, wherein heating the x-ray window includes heating to a temperature above a melting point of the liquid crystal polymer.

5. The method of claim 1, wherein heating the x-ray window includes heating to a temperature above a glass transition temperature of the liquid crystal polymer.

6. The method of claim 1, wherein the liquid crystal polymer is thermotropic.

7. A method of making an x-ray window, the method comprising:

placing a liquid crystal polymer between a thin film and a housing, the liquid crystal polymer includes an aromatic polyester;

pressing the thin film and the housing towards each other and towards the liquid crystal polymer sandwiched between them; and wherein weight loss of the liquid crystal polymer, prior to placing the liquid crystal polymer between the thin film and the housing, is $\leq 1\%$ at a temperature of 225° C. during a 24 hour period.

8. The method of claim 7, wherein the thin film and the housing are pressed towards each other and towards the liquid crystal polymer with a pressure of $\geq 1$ KPa and $\leq 50$ KPa.

9. The method of claim 7, wherein the thin film and the housing are pressed towards each other and towards the liquid crystal polymer with a pressure of $\geq 1$ KPa.

10. The method of claim 7, wherein the liquid crystal polymer is thermotropic.

11. A method of making an x-ray window, the method comprising:

placing a liquid crystal polymer between a thin film and a housing, the liquid crystal polymer being thermotropic;

pressing the thin film and the housing towards each other and towards the liquid crystal polymer sandwiched between them; and heating the x-ray window; and wherein weight loss of the liquid crystal polymer, prior to placing the liquid crystal polymer between the thin film and the housing, is $\leq 1\%$ at a temperature of 225° C. during a 24 hour period.

12. The method of claim 11, wherein the liquid crystal polymer includes an aromatic polyester.

13. The method of claim 11, wherein the thin film and the housing are pressed towards each other and towards the liquid crystal polymer with a pressure of $\geq 1$ KPa and $\leq 50$ KPa.

14. The method of claim 11, wherein the thin film and the housing are pressed towards each other and towards the liquid crystal polymer with a pressure of ≥1 KPa.

15. A method of making an x-ray window, the method comprising:
- placing a liquid crystal polymer between a thin film and a housing, the liquid crystal polymer being thermotropic;
- pressing the thin film and the housing towards each other and towards the liquid crystal polymer sandwiched between them; and
- heating the x-ray window to a temperature of ≥250° C. and ≤500° C.; and
- wherein heating the x-ray window includes maintaining the x-ray window at the temperature for a time of ≥30 minutes and ≤6 hours.

16. The method of claim 15, wherein heating the x-ray window includes heating to a temperature above a melting point of the liquid crystal polymer.

17. The method of claim 15, wherein heating the x-ray window includes heating to a temperature above a glass transition temperature of the liquid crystal polymer.

18. The method of claim 15, wherein the thin film and the housing are pressed towards each other and towards the liquid crystal polymer with a pressure of ≥1 KPa and ≤50 KPa.

19. The method of claim 15, wherein the thin film and the housing are pressed towards each other and towards the liquid crystal polymer with a pressure of ≥1 KPa.

20. The method of claim 15, wherein the liquid crystal polymer includes an aromatic polyester.

* * * * *